United States Patent
Lerchenmueller

(10) Patent No.: US 9,921,081 B2
(45) Date of Patent: Mar. 20, 2018

(54) METHOD FOR MONITORING A ROTATION OF A COMPRESSOR WHEEL

(71) Applicant: Robert Bosch GmbH, Stuttgart (DE)

(72) Inventor: Klaus Lerchenmueller, Rettenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 253 days.

(21) Appl. No.: 14/649,141

(22) PCT Filed: Oct. 16, 2013

(86) PCT No.: PCT/EP2013/071639
§ 371 (c)(1),
(2) Date: Jun. 2, 2015

(87) PCT Pub. No.: WO2014/086526
PCT Pub. Date: Jun. 12, 2014

(65) Prior Publication Data
US 2015/0308859 A1    Oct. 29, 2015

(30) Foreign Application Priority Data

Dec. 4, 2012   (DE) .................. 10 2012 222 202

(51) Int. Cl.
*G01D 5/20*      (2006.01)
*F02D 41/22*     (2006.01)
(Continued)

(52) U.S. Cl.
CPC .............. *G01D 5/20* (2013.01); *F02B 39/16* (2013.01); *F02C 6/12* (2013.01); *F02D 41/22* (2013.01);
(Continued)

(58) Field of Classification Search
CPC .... G01P 3/48; G01P 21/02; G01P 3/00; G01P 3/481; G01P 3/488; G01P 3/49;
(Continued)

(56) References Cited

U.S. PATENT DOCUMENTS

| | | |
|---|---|---|
| 3,488,581 A | 1/1970 | Foster |
| 3,680,363 A | 8/1972 | Holz et al. |

(Continued)

FOREIGN PATENT DOCUMENTS

| | | |
|---|---|---|
| JP | H1062109 A | 3/1998 |
| JP | 2006177163 | 7/2006 |
| JP | 2012137369 A | 7/2012 |

OTHER PUBLICATIONS

International Search Report for PCT/EP2014/071637, dated Feb. 6, 2014.

(Continued)

*Primary Examiner* — Freddie Kirkland, III
(74) *Attorney, Agent, or Firm* — Norton Rose Fulbright US LLP; Gerard Messina

(57) ABSTRACT

In a method for monitoring a rotation of a compressor wheel of an exhaust-gas turbocharger, which compressor wheel has on the peripheral side a number n of blades, an inductive sensor is provided for detecting the speed or rotational frequency, which sensor produces at least one output signal as a function of eddy currents generated as the blades pass by, and the rotational speed of the compressor wheel is inferred from a fundamental frequency of the output signal. In addition, information about a fault of the compressor wheel is derived from at least one modulation of the output signal, e.g., amplitude modulation, and an imbalance of the compressor wheel is detected.

10 Claims, 2 Drawing Sheets

(51) Int. Cl.
*F02B 39/16* (2006.01)
*G01P 3/488* (2006.01)
*G01P 3/49* (2006.01)
*G01P 21/02* (2006.01)
*G01M 13/00* (2006.01)
*F04D 27/00* (2006.01)
*F02C 6/12* (2006.01)
*F01D 21/00* (2006.01)
*F02D 41/00* (2006.01)

(52) U.S. Cl.
CPC ........... *F04D 27/001* (2013.01); *G01M 13/00* (2013.01); *G01P 3/488* (2013.01); *G01P 3/49* (2013.01); *G01P 21/02* (2013.01); *F01D 21/003* (2013.01); *F02D 41/0007* (2013.01); *F05D 2220/40* (2013.01); *F05D 2260/80* (2013.01); *Y02T 10/40* (2013.01)

(58) Field of Classification Search
CPC ...... F02B 39/16; F02D 41/0007; F02D 41/22; F04D 27/001; G01D 5/20; Y02T 10/40
See application file for complete search history.

(56) References Cited

U.S. PATENT DOCUMENTS

| | | | | |
|---|---|---|---|---|
| 6,445,995 | B1* | 9/2002 | Mollmann | G01H 1/006 235/103 |
| 6,785,635 | B2* | 8/2004 | von Flotow | G01H 1/006 250/224 |
| 7,631,498 | B2* | 12/2009 | Greentree | F01D 21/003 324/174 |
| 8,393,852 | B2* | 3/2013 | Kaufmann | F02B 39/16 415/1 |
| 8,504,321 | B2* | 8/2013 | Seidel | F02D 41/0007 702/142 |
| 9,014,944 | B2* | 4/2015 | Davison | F02C 9/00 701/100 |
| 9,046,050 | B2* | 6/2015 | Worden | F02D 41/0085 |
| 9,267,959 | B2* | 2/2016 | Hochreutiner | G01P 3/00 |
| 2003/0060986 | A1* | 3/2003 | Flotow | G01H 1/006 702/36 |
| 2007/0079613 | A1* | 4/2007 | Greentree | F01D 21/003 60/602 |

OTHER PUBLICATIONS

Konrad Reif: Sensors in a motor vehicle [Sensoren im Kraftfahrzeug], 1st edition 2010, on pp. 63 through 73 and 120 through 129.

* cited by examiner

METHOD FOR MONITORING A ROTATION OF A COMPRESSOR WHEEL

BACKGROUND OF THE INVENTION

1. Field of the Invention

The present invention relates to a method for monitoring a rotation of a compressor wheel of a turbocharger.

2. Description of the Related Art

In passenger car applications as well as in commercial motor vehicle applications, exhaust-gas turbochargers are increasingly used in order to increase the efficiency of the engine output. Today, already approximately 30% of commercial motor vehicles have an exhaust-gas turbocharger, tendency rising. As is known, such applications of exhaust-gas turbochargers are used to secure and increase the reliability as well as for the purpose of an improved utilization of the system limits. For monitoring the exhaust-gas turbochargers, sensors are normally used, which monitor the rotation of the rotating turbine wheels or compressor wheels, for example. In twin-turbo systems or sequential turbocharging, the sensors are also required for regulating the exhaust system and/or for coordinating the turbochargers.

Numerous sensors are known from the related art, which detect at least one rotational property of rotating elements such as the compressor wheel or the compressor wheel of an exhaust-gas turbocharger. Rotational properties are generally to be understood as properties that at least partially describe the rotation of the rotating element. For instance, these may be angular speeds, rotational speeds, angular accelerations, angles of rotation, angular positions or other properties that could characterize a continuous or discontinuous, uniform or nonuniform rotation or turning of the rotating element. Examples of such sensors are described in Konrad Reif: Sensors in a motor vehicle [Sensoren im Kraftfahrzeug], 1st edition 2010, on pages 63 through 73 and 120 through 129. A particular point of concentration of the present invention, to which the present invention is not limited, however, is a detection of rotational speed.

To detect a rotational speed of a turbocharger, for example, it is possible to ascertain the rotational speed of the compressor wheel of the turbocharger via a detection of the individual moving compressor blades. Sensors may be used for this purpose, for example, which are based on a passive-inductive measuring principle. According to this measuring principle, the compressor blades following a rotary motion are guided through a stationary primary magnetic field, which causes in a known manner eddy currents in the compressor blades, which are preferably made of light metal, which eddy currents in turn generate a separate so-called secondary magnetic field. In the area of the sensor, which normally has a coil as sensor element, the secondary magnetic field produces an inductive current that is periodic with the rotation of the compressor blades and changes over time, and which may be used by the sensor as an output signal for example for computing the rotational speed of the compressor wheel. The alternating current induced in the coil of the sensor head normally depends for example on the speed of the passing compressor blades, the strength of the material-specific eddy field of the compressor blades, the distance between the individual compressor blades as well as the distance between the compressor blades and the sensor head. Particularly in the area of commercial vehicles, high reliability requirements are placed on a function of the vehicle, because a failure, particularly due to a breakdown of an exhaust-gas turbocharger, is usually associated with a time-consuming repair and an equally time-consuming loss of use of the vehicle. In the usual commercial use of the vehicles, the latter has negative economic consequences.

Consequently, it is not only necessary to monitor and ensure a current functioning of the turbocharger, but furthermore a prediction of the probability of failure as well as an early warning based on such prediction of a failure of the turbocharger are required.

BRIEF SUMMARY OF THE INVENTION

Therefore, a method for monitoring a rotation of a compressor wheel, in particular of a compressor wheel of an exhaust-gas turbocharger, as well as a device for carrying out the method are provided, which have the advantage over known methods of allowing for a statement or prediction regarding the probability of a fault of the rotation.

The method provided is used to monitor a rotation of a compressor wheel of an exhaust-gas turbocharger. The compressor wheel in this instance has a predetermined number n of blades situated on the peripheral side, where n is a whole number. Furthermore, in the method according to the present invention, a sensor is used for detecting at least one rotational property of the compressor wheel. The sensor is preferably an inductive sensor, which in accordance with the related art may include for example a magnetic field generator for generating a magnetic field at the location of the blades of the compressor wheel, as well as a magnet sensor, for example in the form of a coil. According to the method of the present invention, the sensor produces at least one output signal as a function of the eddy currents generated by the passing blades. The output signal of the sensor may be preferably an alternating current signal and/or an alternating voltage signal.

In the provided method, an inference is furthermore made from a fundamental frequency of the output signal to the rotational property, in particular the rotational speed of the compressor wheel. According to the underlying inductive measuring method of the sensor, preferably a sinusoidal alternating current signal or alternating voltage signal is generated, which produces a positive or negative peak of the output signal as a function of the passing of each blade of the compressor wheel past the sensor. The output signal generated in this manner accordingly has a so-called fundamental oscillation having a frequency corresponding to the product of the number n of blades of the compressor wheel multiplied by the current rotational speed of the compressor wheel. This fundamental frequency may also be understood as an increment frequency, that is, as the frequency of the detected magnetic events.

The method according to the present invention furthermore provides for information about a fault of the compressor wheel to be gathered from at least one modulation of the output signal, in particular an additive amplitude modulation. This is in particular to be understood as that the output signal has, in addition to the sinusoidal oscillation generated as a function of the fundamental frequency, another partial signal of a frequency differing from the fundamental frequency additively superposed on it. Accordingly, the method of the present invention now provides for the modulated-upon signal to be extracted from the output signal by using known demodulation methods and/or to separate it from the fundamental oscillation in order to be able to gather information about a fault of the compressor wheel from the extracted signal.

In a particular advantageous manner, the method provided according to the present invention creates the possibility of making a statement or prediction about the probability of a fault of the rotation. In particular, since a simultaneous evaluation of the output signal of the sensor makes it possible to detect a possibly existing fault early and to initiate appropriate additional steps for preventing a deterioration of the fault condition. In the simultaneous evaluation of the output signal of the sensor, as in an evaluation for obtaining the rotational speed for example, it is possible to make use of already known methods of signal conditioning and signal processing. According to another development of the provided method, the gathered information about a fault of the compressor wheel may preferably be information about a type of fault or information about a degree of the fault. The information about the type and/or the degree of the fault may furthermore advantageously be used for a more precise estimation of damage or a fault that is still in the process of arising, or an already existing fault with a view to a temporary and/or final failure of the compressor wheel and/or of the turbocharger.

According to another development of the method, if the fault is an imbalance of the compressor wheel, the additional advantages are derived that the rotating compressor wheel due to the imbalance no longer has a rotationally symmetric distribution of mass and performs a motion oscillating in the radial direction. Due to this motion oscillating radially with respect to the axis of rotation of the compressor wheel, the distance between the outer contour of the blades or of the compressor wheel and the inductive sensor, varies proportionally. Since, as already described at the outset, in the passive-inductive measuring principle, the induction current, or the induction voltage, used as a measured variable, depends directly on the strength of the magnetic eddy field and thus, as is known, also on the distance in particular between the blades and the top end of the sensor pointing in the direction of the compressor wheel. This consequently periodic approach and withdrawal of one or more blades of the compressor wheel with respect to the sensor consequently affects essentially the amplitude of the peak of the induction current, for example, corresponding to the respective blade. These changes or variances in the amplitude of the respective signal peaks of the induction current are detectable in a simple manner, which advantageously allows for a detection of a fault, in particular of an imbalance of the compressor wheel.

According to another development of the provided method, it may be particularly advantageous if the fundamental frequency corresponds to the n-fold of the rotational speed of the compressor wheel. This is in particular aided by the fact that the compressor wheel has a number n of blades. It is furthermore preferred if the output signal of the sensor is examined with respect to a modulation of the output signal, in particular in the range of a frequency having the one-fold to two-fold of the nth part of the fundamental frequency. A type and/or a degree of the fault may be inferred particularly from the ratio of the frequency of the modulated-upon signal component to the fundamental frequency.

Furthermore, according to another development of the provided method, it may be of particular advantage if the type and/or degree of the fault is ascertained as a function of an instantaneous value and/or a change of the amplitude of the output signal. Preferably, a characteristic of the change of the maxima and minima of a curve of the output signal is used to ascertain the type and/or the degree of the fault.

Furthermore, there may be a provision that, in carrying out the provided method, the rotational speed of the rotating element is reduced and/or limited as a function of the type and/or degree of the ascertained fault. This advantageously creates the possibility of preventing a deterioration of the fault or even a total failure of the turbocharger.

Alternatively or additionally, a provision may be made for this purpose that an optical and/or acoustical warning signal is generated that is perceptible for example for the driver of a motor vehicle, and that the latter may be informed early about the fault. This would allow the driver of the motor vehicle to drive in time for example to a repair shop in order to have the fault and also possible causes of the fault removed.

Furthermore, a device according to the present invention for carrying out the previously described method is described and provided.

The device provided in accordance with the present invention for monitoring a rotation of a compressor wheel has at least one sensor for detecting at least one rotational property of the compressor wheel, the sensor being an inductive sensor. The sensor produces at least one output signal as a function of the eddy currents generated by the passing of the blades past the sensor. The device provided according to the present invention furthermore includes at least one evaluation unit for evaluating the output signal. The provided device is furthermore designed to carry out the previously described method, in particular in order to gather information about a fault of the compressor wheel from at least one modulation of the output signal, in particular an amplitude modulation.

This yields the same advantages as in the previously described method according to the present invention.

According to another development of the device, there may be in particular a provision for the evaluation unit to have a demodulator, in particular an envelope curve demodulator, the demodulator being designed to produce a demodulated signal from the output signal and to gather information about the fault of the compressor wheel from the demodulated signal. The demodulation, in particular an envelope curve detection, is able to produce a signal caused by the fault of the compressor wheel, which is produced in the sensor for example from an additive amplitude modulation of the signal and a fault-free measuring signal. Furthermore, an envelope curve demodulator or an envelope curve detector offers in particular the advantage that it is able to be implemented in the evaluation unit in a particularly simple manner by providing a corresponding electrical circuit.

Furthermore, there may be a provision for the device and/or the evaluation unit to be connected to an engine control unit in particular via corresponding electric lines and for the device to be designed to produce a warning signal as a function of the type and/or degree of the fault. In addition, it may also be advantageous for the warning signal to be an analog or digital warning signal, and for this to be transmitted by the device and/or the evaluation unit to the engine control unit.

One possible specific embodiment of the device may furthermore provide for the evaluation unit to include an error memory or to be connected to an error memory of an engine control unit, and for the device moreover to be designed to make an entry about the fault in the error memory. In particular, this may yield the advantage that an entry about a possibly continuous fault may be made repeatedly at certain time intervals. Advantageously, this provides for the possibility that a motor vehicle mechanic for example is able to read out the error memory electronically and thus receives additional information about the type and/or degree of the fault in order to be able to repair it in a manner that saves as much time and costs as possible. Alternatively or additionally, the device may advantageously be designed to reduce or limit the rotational speed of the compressor wheel as a function of the type and/or degree of the fault. This allows for an immediate intervention of the device, which reduces the rotational speed of the compressor wheel essentially as a function of the degree of the fault in order to prevent in particular a destruction and a total failure of the compressor wheel and possibly to prevent a further deterioration of the fault condition by a further limitation of the rotational speed of the compressor wheel. In the event that the device reduces and possibly continuously limits the rotational speed of the compressor wheel because of a fault, there may be a further provision that a continuous limitation of the rotational speed of the compressor wheel possibly performed by the device must be reset or canceled by a motor vehicle mechanic only after maintenance and/or repair of the compressor wheel and in particular the removal of the fault by the motor vehicle mechanic.

DETAILED DESCRIPTION OF THE INVENTION

Figure 1:
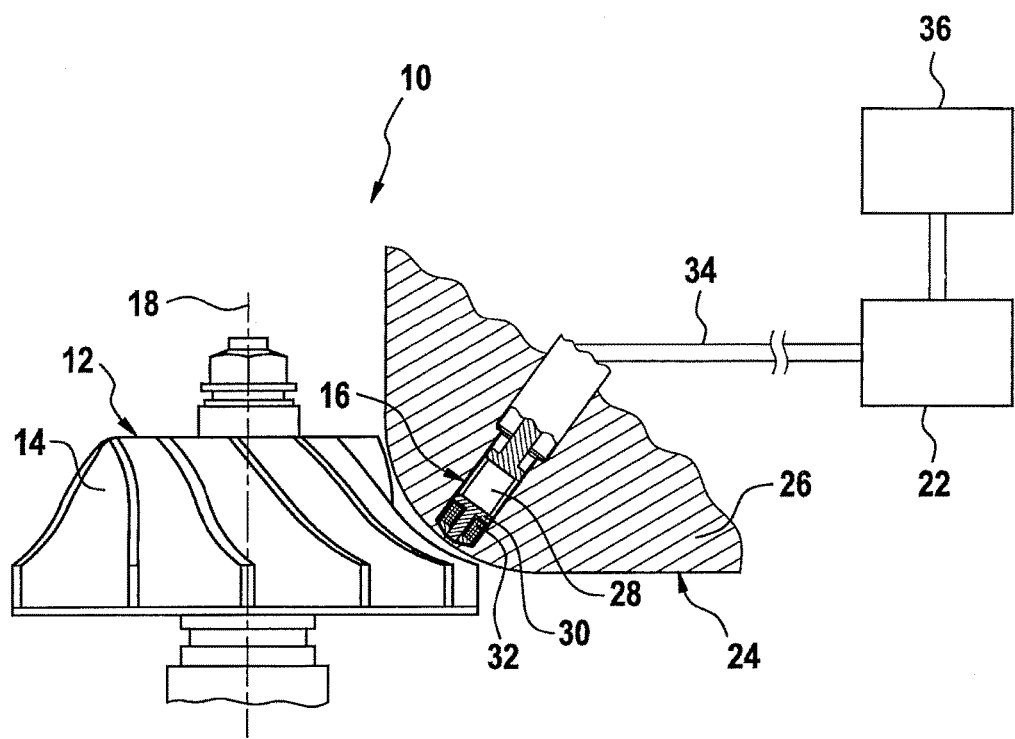
FIG. 1 a schematic of a specific embodiment of the device provided in accordance with the present invention.

The representation of FIG. 1 shows a possible specific embodiment of a device 10 for monitoring a rotation of a compressor wheel 12, in particular of a compressor wheel 12 of a turbocharger, as well as for carrying out the method provided in accordance with the present invention, compressor wheel 12 having on the peripheral side a number n of blades 14. Device 10 furthermore includes at least one sensor 16, preferably an inductive sensor 16, for detecting at least one rotational property of compressor wheel 12. Compressor wheel 12 preferably rotates about axis of rotation 18.

As a function of the eddy currents generated by the passing of blades 14, sensor 16 produces at least one output signal 20, device 10 furthermore having at least one evaluation unit 22 for evaluating output signal 20. In the evaluation of output signal 20, the rotational property, in particular the rotational speed, of compressor wheel 12 may be inferred from a fundamental frequency of output signal 20. Evaluation unit 22 is in particular designed to gather information about a fault of compressor wheel 12 from at least one modulation of output signal 20, in particular an amplitude modulation.

Device 10 is furthermore preferably situated in a compressor housing 24. It may be gathered in particular from the representation of FIG. 1 that blades 14 situated on a compressor wheel 12, in their joint motion about rotational axis 18, are guided past the end face of sensor 16 in the area of a housing section 26 of compressor housing 24. In the process, particularly a magnetic field generated by, magnetic field generator 28 of sensor 16 is captured by blades 14, which are preferably made of light metal. Due to their essentially perpendicular motion with respect to the orientation of the magnetic field, the magnetic lines of force conducted by pole pin 30 to magnetic field generator 28 are influenced in such a way that a fluctuation of the magnetic flux within pole pin 30 induces a current in coil 32 surrounding pole pin 30. This induction current generated in coil 32 may be detected by sensor 16 and may be utilized optionally directly as output signal 20 of sensor 16 or for generating a corresponding output signal 20.

It may also be gathered from the representation in FIG. 1 that evaluation unit 22 of device 10 is connected to sensor 16 preferably by lines 34. Output signal 20 of sensor 16 is transmitted to evaluation unit 22 via lines 34. FIG. 1 also shows that device 10 is preferably connected to an engine control unit 36 and is able, if necessary, to make entries into an error memory (not shown) of engine control unit 36. Expressed differently, engine control unit 36 may be designed to read out the evaluated output signals 20 from evaluation unit 22 and to make a respective entry in the error memory of engine control unit 36 in the event of a detected fault.

Figure 2:
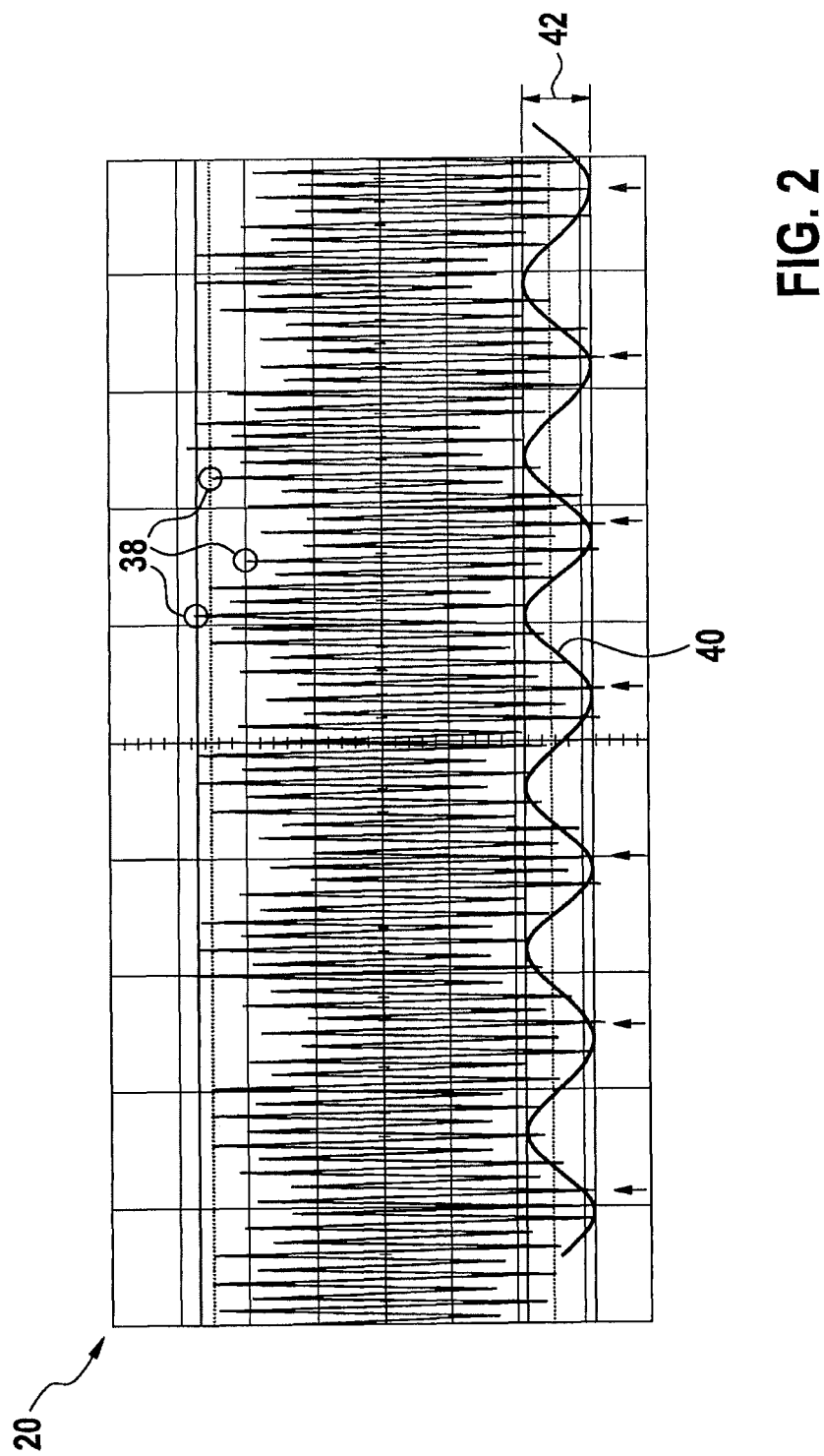
FIG. 2 a graphic representation of a signal characteristic of a detected output signal of a turbocharger having a strong imbalance.

The representation of FIG. 2 shows a corresponding curve pattern of a measured output signal 20 of a sensor 16 for detecting at least one rotational property of compressor wheel 12. Measured output signal 20 has a frequency, in particular a fundamental frequency, that corresponds to the increment frequency. The increment frequency merely indicates how many individual magnetic events generated by the passing of blades 14 of compressor wheel 12 were able to be detected. The fundamental frequency thus corresponds preferably to the n-fold of the rotational speed of compressor wheel 12, n being the number of blades 14 of compressor wheel 12. Due to the inductive measuring principle, on which sensor 16 is preferably based, there exists a definite proportional dependency between the peak values 38 of the peaks of output signal 20 and the distance between the respective passing blades 14 of compressor wheel 12 and sensor 16, in particular a pole pin 30 and/or a preferred coil 32 situated possibly in a top region of sensor 16.

As may be gathered further from the representation of FIG. 2, the individual peaks vary in their peak values 38. From this a changing distance may be inferred between sensor 16 and passing blades 14. As is furthermore shown in FIG. 2, another curve is drawn below the curve for output signal 20, which corresponds to modulated-upon signal 40. At the same time, modulated-upon signal 40 corresponds to a so-called enveloping curve of output signal 20. Modulated-upon signal 40 may have in particular a frequency in the range of the rotational speed of compressor wheel 12. Expressed differently, modulated-upon signal 40 may in particular have a frequency in the range of the nth part of the fundamental frequency of output signal 20. This is so in particular if a fault, in particular an imbalance, occurs for example by a shift of the mass center of compressor wheel 12, independently of whether this is caused by a single or multiple instances of damage.

Possible developments of the method according to the present invention may in particular provide for an inference from peak-peak value 42 of modulated-upon signal 40 to the variance of the distance between sensor 16 and passing blades 14 and furthermore consequently a severity of the fault, in particular of an imbalance, or the severity of the shift of the mass center.

What is claimed is:
1. A method for monitoring a rotation of a compressor wheel of an exhaust-gas turbocharger, the compressor wheel having on the peripheral side a number n of blades, the method comprising:
generating, by an inductive sensor, at least one output signal as a function of eddy currents generated as the blades pass by the sensor;
an evaluation unit analyzing the at least one output signal to determine a fundamental frequency of the output signal and a frequency of an envelope of the funda- mental frequency, wherein the determination of the frequency of the envelope is obtained by demodulation of the output signal;

determining, by the evaluation unit, a rotational speed of the compressor wheel from the determined fundamental frequency of the output signal; and determining, by the evaluation unit, a fault of the compressor wheel based on the frequency of the envelope derived from the demodulation of the output signal.

2. The method as recited in claim 1, wherein the determination of the fault of the compressor includes determining at least one of a type and a degree of the fault.

3. The method as recited in claim 2, wherein the fault is an imbalance of the compressor wheel.

4. The method as recited in claim 2, wherein the fundamental frequency is the n-fold of the rotational speed of the compressor wheel.

5. The method as recited in claim 2, wherein the rotational speed of the compressor wheel is at least one of reduced and limited as a function of the at least one of the type and the degree of the ascertained fault.

6. The method as recited in claim 1, wherein the determination of the fault includes comparing the frequency of the envelope and the fundamental frequency.

7. The method as recited in claim 6, wherein the determination of the fault of includes determining a ratio of the frequency of the envelope to the fundamental frequency.

8. A device for monitoring a rotation of compressor wheel of an exhaust-gas turbocharger, the compressor wheel having on the peripheral side a number n of blades, the device comprising:

at least one inductive sensor for generating at least one output signal as a function of eddy currents generated as the blades pass by the sensor; and at least one evaluation unit, including a demodulator, configured to:

evaluate the output signal to determine a fundamental frequency of the output signal and a frequency of an envelope of the fundamental frequency, wherein the determination of the frequency of the envelope is obtained by the demodulator demodulating the output signal;

determine a rotational speed of the compressor wheel from the determined fundamental frequency of the output signal; and determine a fault of the compressor wheel based on the frequency of the envelope derived from the demodulation of the output signal.

9. The device as recited in claim 8, wherein the evaluation unit is connected to an engine control unit, and wherein the evaluation unit is configured to produce a warning signal as a function of the at least one of the type and the degree of the fault.

10. The device as recited in claim 8, wherein the evaluation unit includes an error memory or is connected to an error memory of an engine control unit, and wherein the evaluation unit is configured to make an entry about the fault in the error memory.

* * * * *